United States Patent [19]
Motoyama et al.

[11] Patent Number: 5,193,508
[45] Date of Patent: Mar. 16, 1993

[54] FUEL INJECTION SYSTEM

[75] Inventors: Yu Motoyama; Ryusuke Kato; Yoshihiko Moriya, all of Iwata, Japan

[73] Assignee: Yamaha Hatsudoki Kabushiki Kaisha, Iwata, Japan

[21] Appl. No.: 515,205

[22] Filed: Apr. 27, 1990

[30] Foreign Application Priority Data

Apr. 28, 1989 [JP] Japan .................................. 1-107598

[51] Int. Cl.$^5$ ............................................ F02M 23/06
[52] U.S. Cl. ................................ 123/460; 123/73 C; 123/458
[58] Field of Search ............... 123/461, 460, 459, 463, 123/73 C, 458, 497, 457

[56] References Cited

U.S. PATENT DOCUMENTS

| | | | |
|---|---|---|---|
| 4,059,076 | 11/1977 | Kosaka | 123/73 C |
| 4,527,528 | 7/1985 | Finn | 123/456 |
| 4,699,109 | 10/1987 | Hensel | 123/458 |
| 4,794,901 | 1/1989 | Hong | 123/73 C |
| 4,829,964 | 5/1989 | Asayama | 123/458 |
| 4,860,699 | 8/1989 | Rocklein | 123/73 C |
| 4,934,346 | 6/1990 | Olson | 123/73 C |
| 4,984,540 | 1/1991 | Morikawa | 123/73 C |

Primary Examiner—Carl Stuart Miller
Attorney, Agent, or Firm—Ernest A. Beutler

[57] ABSTRACT

Two embodiments of fuel injection systems for two cycle crankcase compression internal combustion engines that employ two fuel injectors. One fuel injector injects into the combustion chamber while another injects into the induction system of the engine. A simplified regulating system is incorporated so that the first injector receives fuel under a higher pressure than the second injector.

11 Claims, 4 Drawing Sheets

FUEL INJECTION SYSTEM

BACKGROUND OF THE INVENTION

This invention relates to a fuel injection system and more particularly to an improved injection system that employs a pair of fuel injectors each of which injects fuel at a different pressure.

The use of direct cylinder injection has several advantages. These advantages may be employed with both two and four cycle engines. However, when direct cylinder injection is used in a two cycle, then only pure air is inducted into the crank case. Because of this and the fact that a two cycle engine fires on every crankshaft revolution rather than every other crankshaft revolution, direct injection into the combustion chamber of a two cycle engine might give rise to problems in connection with inadequate piston cooling and high combustion chamber temperature. Therefore, it has been proposed to inject at least a small amount of fuel into the intake system under at least high load conditions so as to achieve piston cooling.

Where two fuel injectors are employed that inject fuel into the different areas of the engine there are certain problems which arise. For example, the injection nozzle that sprays into the combustion chamber must be supplied with fuel at a relatively high pressure. However, high pressure fuel should not be injected into the induction passage because this can give rise to excess fuel deposit on the induction passages. Also, the use of high pressure fuel makes it difficult to control the amount of fuel being injected into such a low pressure area and control problems can arise. If, however, the injection pressure is reduced, the combustion chamber fuel injector may not supply adequate fuel for high performance and control can become a problem. If separate pressure pumps and pressure regulators are applied for each of the injection nozzles, the system becomes expensive and complicated.

It is, therefore, a principal object of this invention to provide an improved fuel injection system for an engine.

It is a further object of this invention to provide a fuel injection system for an engine wherein two fuel injectors are employed and each is supplied with fuel from the same source and same fuel pump and at different pressures.

It is a further object of this invention to provide an improved and simplified delivery and regulating system for multiple injection nozzles associated with a single combustion chamber of an engine.

SUMMARY OF THE INVENTION

This invention is adapted to be embodied in a fuel injection system for an internal combustion engine comprising a first fuel injector for injecting fuel to the engine at a first location and a second fuel injector for injecting fuel to the engine at a second location. A fuel supply system is provided that includes a fuel tank and a fuel pump that delivers fuel under pressure from the fuel tank to each of the fuel injectors. Pressure regulating means are incorporated for supplying the second fuel injector with fuel at a pressure lower than the pressure at which fuel is supplied to the first fuel injector.

DETAILED DESCRIPTION OF THE PREFERRED EMBODIMENTS

Figure 1:
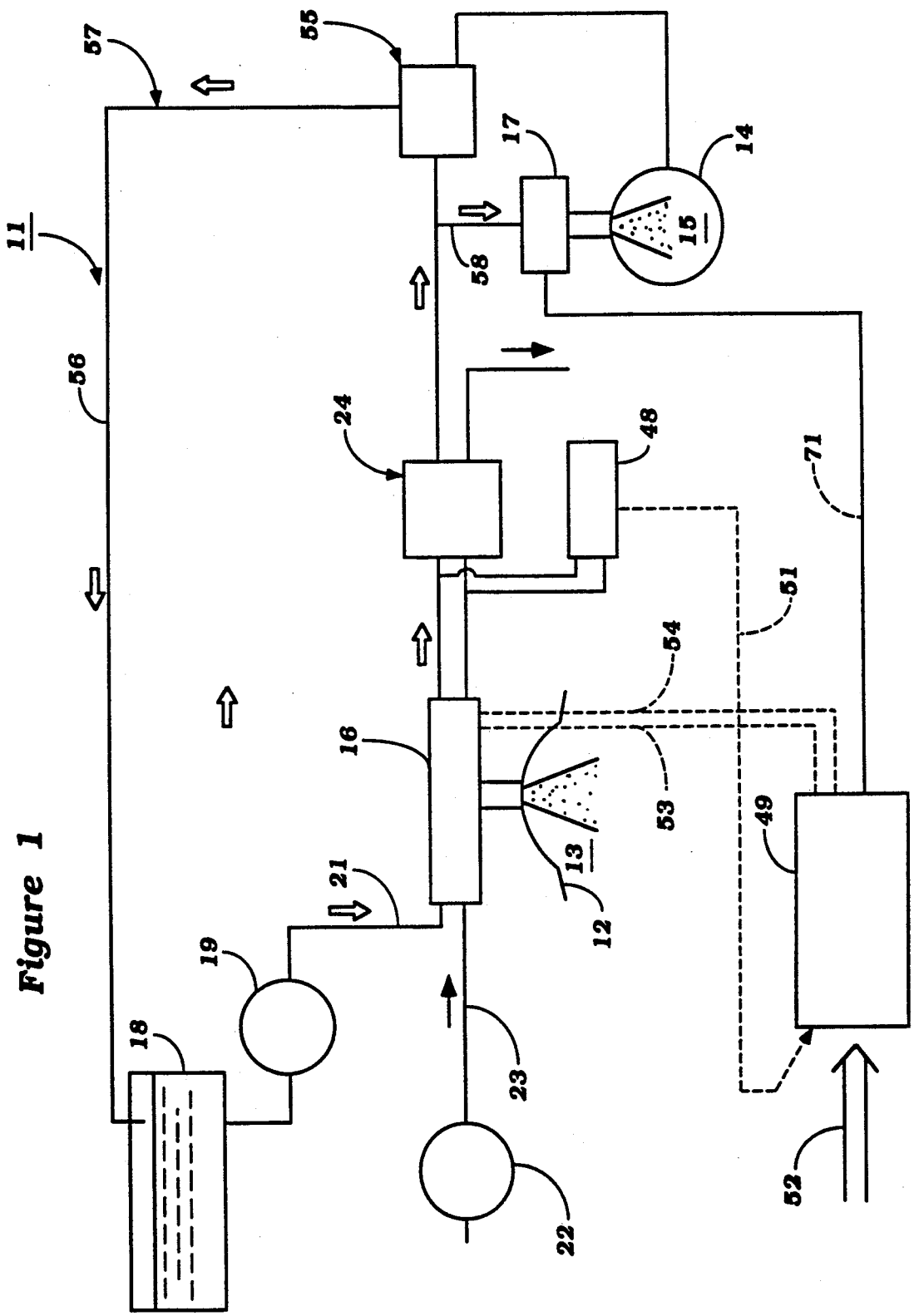
FIG. 1 is a partially schematic fuel of a fuel injector system for an internal combustion engine constructed in accordance with a first embodiment of the invention.
Figure 2:
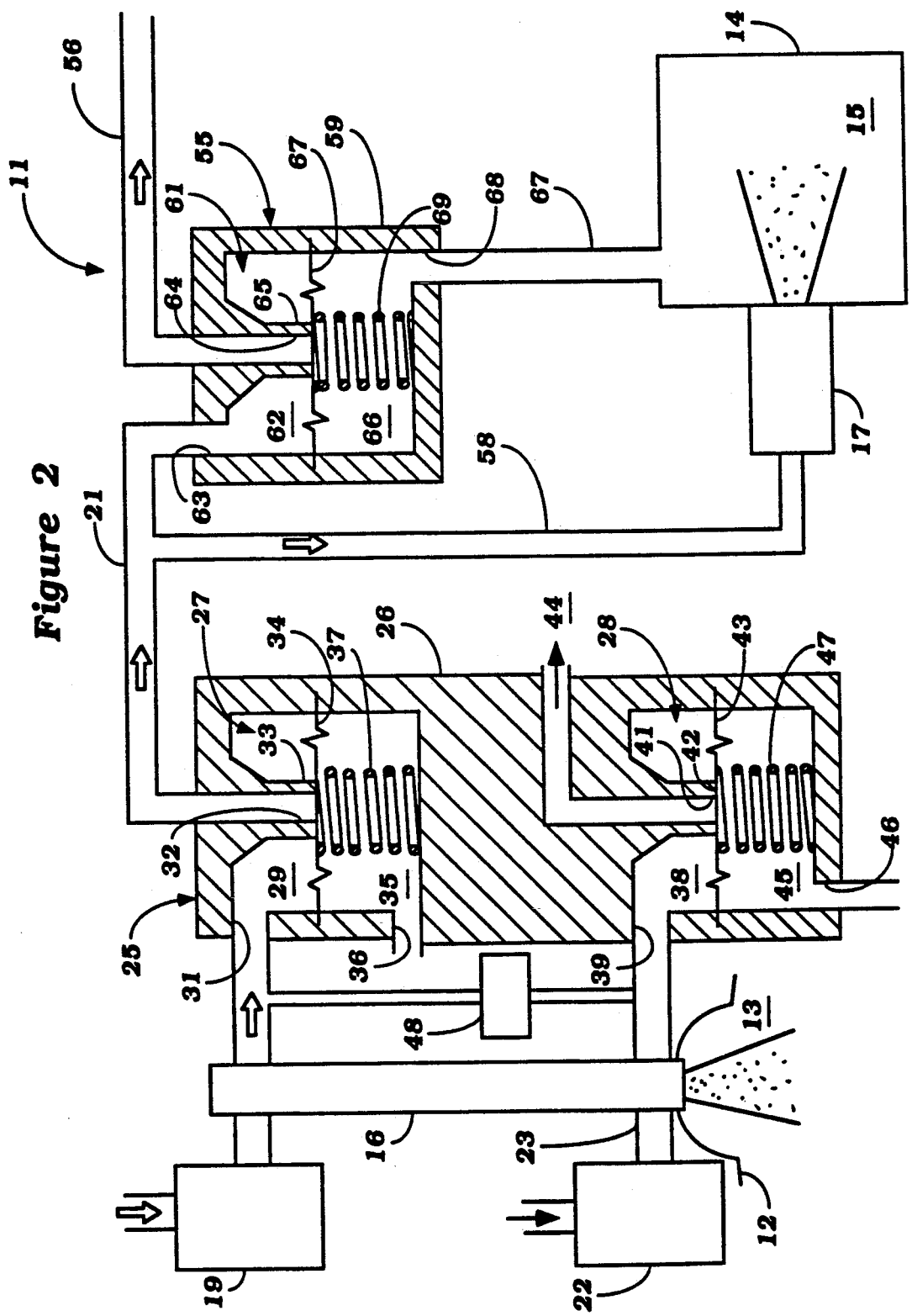
FIG. 2 is a cross sectional—schematic view showing the pressure regulating system for the fuel injectors of this embodiment.

Referring first to the embodiment of FIGS. 1 and 2, a fuel injection system for an internal combustion engine is identified generally by the reference numerals 11 and is shown partially in schematic fashion. The associated internal combustion engine is not shown in full detail because the invention can be practiced with engines of any known type. The invention, however, has particular utility in two cycle crank case compression engine. In order to orient certain of the components of the injection system portions of the engine have been illustrated and these include a cylinder head shown partially and identified by the reference numeral 12 that cooperates to define a combustion chamber 13. The engine is also provided with an induction system and one of the engine induction passages is shown schematically at 14 and which defines a flow passage 15. In a typical two cycle crank case compression engine, the induction passage 14 may be one of the induction passages leading to the crank case chamber of the engine. However, other locations upstream of the combustion chamber are possible It is important, however, that the fuel injection nozzle which will be described in association with the induction passage 14 sprays fuel so that it will contact the piston during its reciprocation to effect cooling.

A fuel injector, indicated generally by the reference numeral 16 is mounted in the cylinder head 12 and sprays directly in the combustion chamber 13. The details of the fuel injector 16 are not illustrated since this invention can be utilized in conjunction with any of the known type of fuel injectors. However, the invention has particular utility with the type of fuel injector which injects both fuel and air under pressure to the combustion chamber 13 and, as will be described, it should be evident that both fuel and air are supplied under pressure to the injector 16.

A fuel injector 17 is mounted to the induction passage 14 and is designed so as to spray into the induction passage 15. In the illustrated embodiment, the injector 17 injects only fuel but the invention, as will become apparent to those skilled in the art, can also be utilized in conjunction with air/fuel injectors. Again, the specific construction of the injector 17 may be of any of the known type.

The fuel supply system for the engine includes a fuel tank 18 in which a body of fuel is contained. A pressure pump 19 is positioned downstream of the tank 18 and supplies fuel under pressure to a conduit 21 in which the injection nozzle 16 is positioned. In addition, air is supplied to the injection nozzle 16 under pressure from a pump 22 which draws atmospheric air through a suitable source and which delivers it through a conduit 23.

Downstream of the fuel injector 16 there is provided a first pressure regular, indicated generally by the reference numeral 24 and having a construction as best shown in FIG. 2 which cooperates so as to regulate the pressure both in the fuel line 21 and the air line 23 so as to provide controlled fuel and air pressure for the injector nozzle 16. Although any desired relationship can be provided for the fuel and air pressure, in a specific embodiment of the invention the regulator 24 may maintain fuel pressure at a pressure approximately 5.5 kg/cm$^2$ while the air pressure is maintained at 5 kg/cm$^2$.

Referring specifically to FIG. 2, the pressure regulator 25 includes a regulator body 26 in which a fuel pressure regulating portion indicated generally by the reference numeral 27 and an air pressure regulating portion, indicated generally by the reference numeral 28 are positioned. The fuel pressure regulating portion 27 includes a regulating chamber 29 that communicates with an inlet port 31 that receives the fuel that is supplied to the injector 16 through the conduit 21. A discharge port 32 is also provided in the chamber 29 by a nozzle portion 33. A flexible diaphragm 34 is contained within the body 26 and defines the chamber 29 and an atmospheric chamber 35 that is subjected to atmospheric pressure through an atmospheric pressure port 36. A coil compression spring 37 is contained within the chamber 35 and normally urges the diaphragm 34 toward a position closing the port 32. The pressure maintained in the chamber 29 will be determined by the preload of the spring 37 as should be readily apparent to those skilled in the art.

In a similar manner, the air pressure regulating portion 28 includes a regulating chamber 38 that has an inlet port 39 which communicates with the conduit 23 that supplies air under pressure to the injector 16. A discharge port 41 is formed within the chamber 38 by means of a nozzle portion 42 and a diaphragm 43 selectively opens and closes the port 41. The port 41 discharges, in this embodiment, to the atmosphere through an atmospheric discharge 44.

An air pressure chamber 45 is formed beneath the diaphragm 43 and has an atmospheric port 46 so that it receives air at atmospheric pressure. A coil compression spring 47 is received in the atmospheric chamber 45 and sets the pressure at which air is supplied to the injector 16.

For control purposes, a differential pressure sensor 48 is provided between the fuel line 21 and the air line 33 to provide a signal of pressure differential to a controller, which is indicated schematically by the reference numeral 49 in FIG. 1 wherein the line for conveying the pressure is indicated by the broken line 51. The controller 49 processes the pressure difference in the line 51 and other control parameters transmitted to it from the engine as indicated by the line 52 and thus controls both the fuel and air quantities discharged by the injector 16 through control lines shown schematically at 53 and 54. Since the specific control strategy employed forms no part of the invention, further description of it is believed to be unnecessary.

For the reasons already noted, since the injector 16 injects directly into the combustion chamber 13 it is desirable to have a higher pressure of both fuel and air delivered to it than the injector 17. In order to provide this difference in pressure, a further pressure regulator, indicated generally by the reference numeral 55 is provided in the line 21 and communicates with a return line 56 that returns fuel for pressure regulation to the tank 18. It should be apparent that the lines 21 and 56 provide a close circuit having a series flow from the tank 18 to the pump 19, to the injector 16, to the regulator 24, to the injector 17, to the regulator 55 and back to the tank 18 through the line 56. This closed loop is identified generally by the reference numeral 57. A branch line 58 off of this provides the fuel supply to the injector 17.

Referring again in detail to FIG. 2, the pressure regulator 55 includes a main body portion 59. Since the injector 17 only injects fuel, the regulator 55 only includes a fuel pressure regulating portion 61. It should be apparent to those skilled in the art, however, that if the injector 17 is an air fuel injector, a regulator of the type employed for regulating the pressure of the fuel and air delivered to the injector 16 may be utilized in place of the regulator 55.

The regulator 55 includes a regulating chamber 62 to which fuel is supplied under the pressure regulated by the regulator portion 27 of the regulator 25 through a port 63. A discharge port 64 is formed in the regulating chamber 62 by a nozzle portion 65 and this port communicates with the return conduit 56.

A regulating chamber 66 is formed beneath a diaphragm 67 that opens and closes the port 64. Rather than providing atmospheric air to the chamber 66, the pressure in the induction passage 15 is delivered here through a conduit 67 and port 68. This is done so as to insure that a predetermined pressure differential will exist between the fuel sprayed by the injector nozzle 17 and the air in the induction passage 15. This permits the amount of fuel to be accurately controlled by changing the duration of injection time of the injector 17. Of course, other injection strategies may be employed. A coil compression spring 69 is contained within the regulating chamber 66 and sets the pressure differential at which fuel will be supplied to the injector nozzle 17.

The amount of fuel sprayed by the injector nozzle 17 is controlled by the controller 49 and the control relationship is indicated by the broken line 71.

As has been noted, the injector 17 receives fuel at a substantially lower pressure than the fuel pressure that is supplied to the injector 16. Using the aforedescribed embodiment, the fuel pressure supplied to the nozzle 17 may be set by the regulator 55 to be approximately 3 kg/cm$^2$ over the pressure in the induction passage 15.

It should be readily apparent that the described circuitry and positioning of the two regulators 24 and 55 is such that the fuel pressure supplied to the two injectors 16 and 17 may be set differently from each other and yet a single supply line and pressure pump is all that is required. As a result, a very simple circuit is provided. Also, although the invention has been described in conjunction with only a single cylinder it should be readily apparent to those skilled in the art how this regulating system can be applied to multiple cylinder engines.

Figure 3:
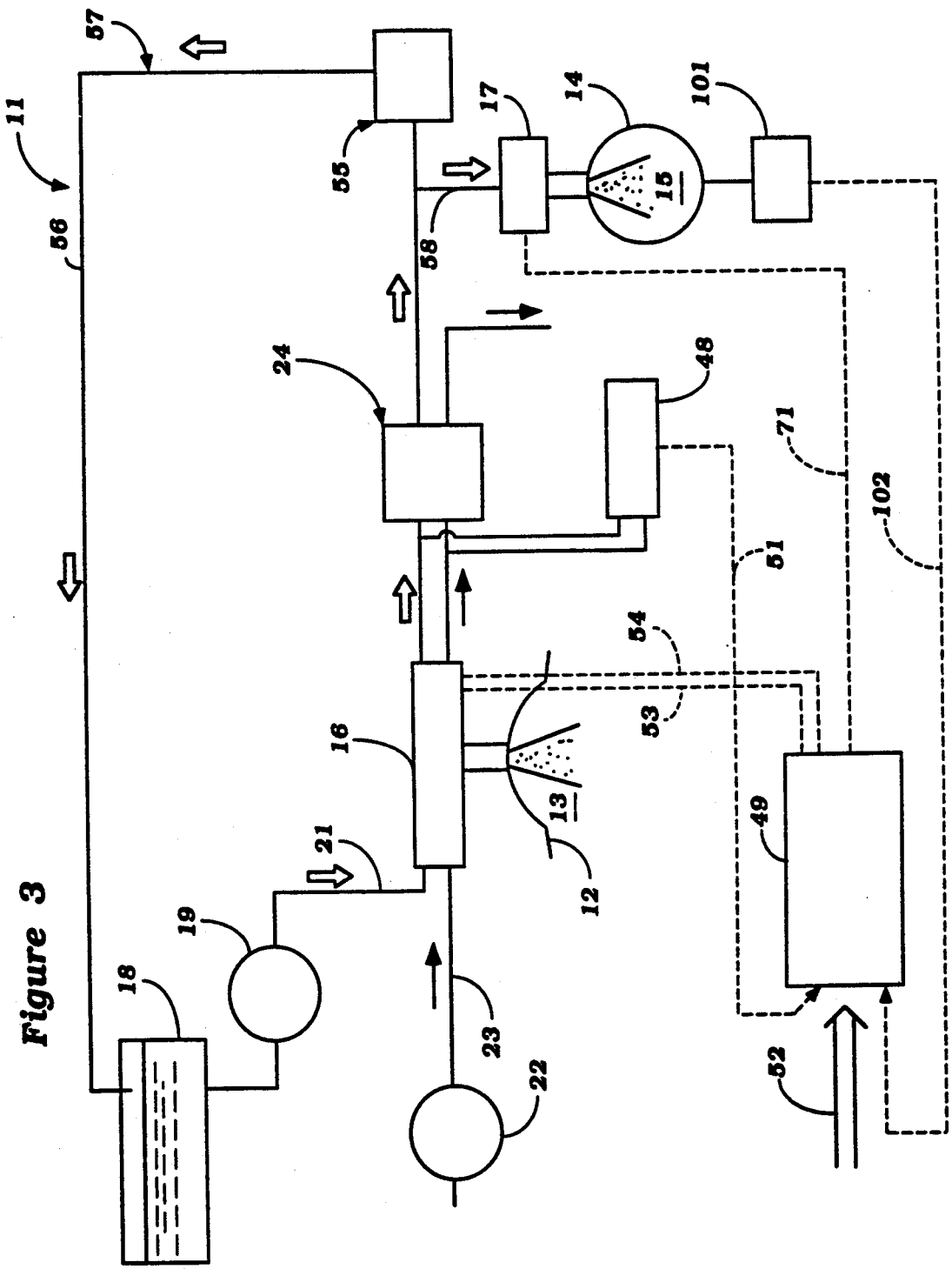
FIG. 3 is a schematic fuel, in part similar to FIG. 1, showing another embodiment of the invention.
Figure 4:
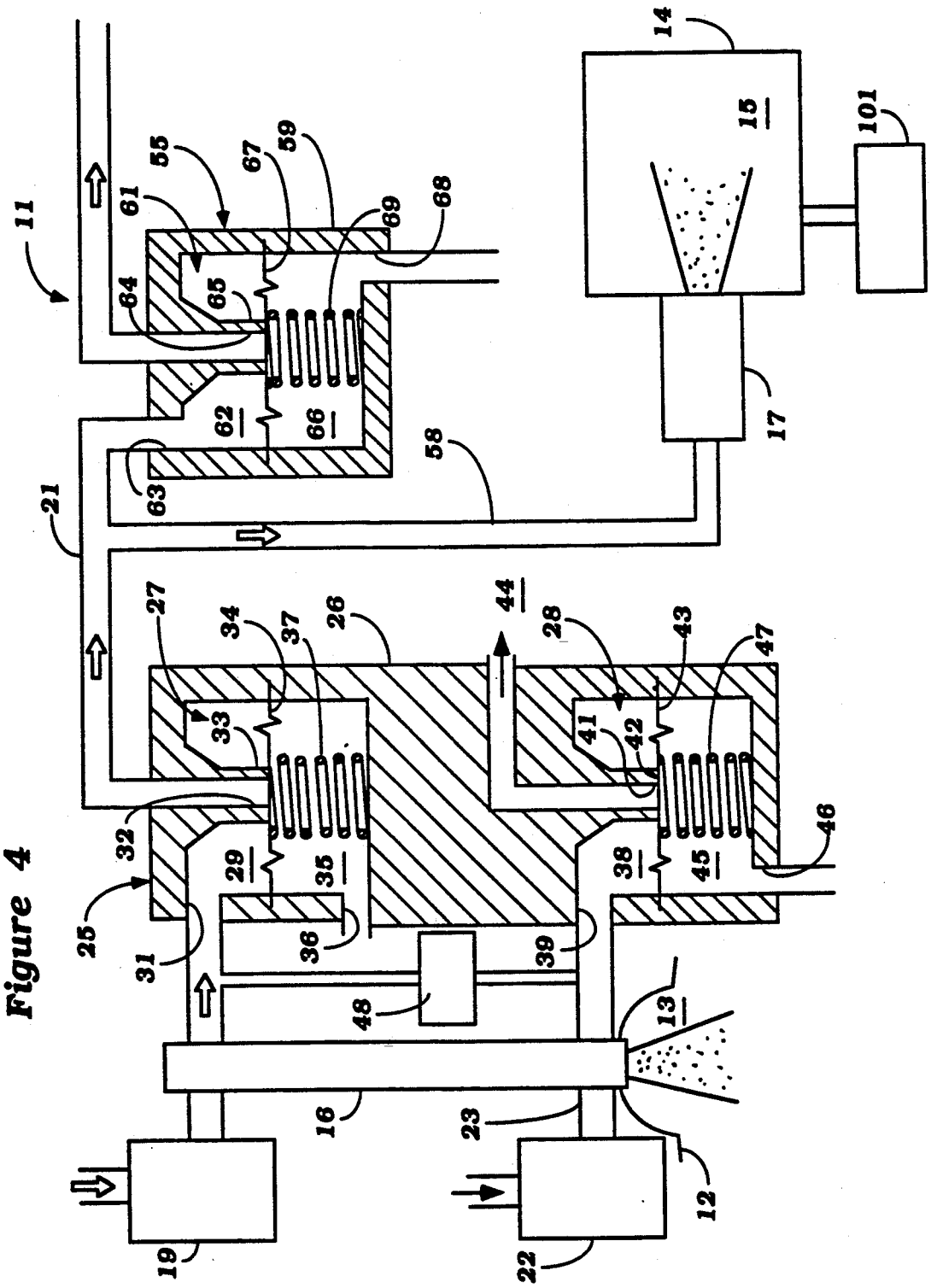
FIG. 4 is a cross sectional—schematic view showing the regulating system of the embodiment of FIG. 3.

In the embodiment as thus far described, the injector 17 received pressure that was regulated at a fixed pressure differential relative to the induction passage 15 into which it discharged. FIGS. 3 and 4 show another embodiment of the invention which is generally the same as the embodiment of FIGS. 1 and 2 but wherein a simplified pressure regulator can be employed in conjunction with the injector 17. Aside from this difference, this embodiment is the same in circuitry as the previously described embodiment and employs the same components. For that reason, those identical components have been identified by the same reference numerals and will not be described again, except insofar as is necessary to understand the construction and operation of this embodiment.

In this embodiment, the regulator 55 has a construction exactly like that of the previously described embodiment. However, the port 68 of the regulating chamber 66 is exposed directly to the atmosphere and rather than to the pressure in the intake passageway 15. As a result, a pressure sensor 101 is provided that senses the pressure in the intake passageway 15 and provides this signal to the controller 49 through a circuit shown schematically in FIG. 3 at 102. As a result, the fuel pressure control may vary the amount of fuel delivered by varying its injection time in accordance with the pressure in the intake passage at 15 as sensed by the sensor 101. Again, any known type of control strategy may be employed with the injection as a whole.

It should be readily apparent from the foregoing description that the described embodiments provide a very simple regulating system for two fuel injectors that supply fuel to different locations in an engine and at different pressures. Although two embodiments of the invention have been illustrated and described, various changes and modifications may be made without departing from the spirit and scope of the invention, as defined by the appended claims.

We claim:

1. A fuel injection system for an internal combustion engine comprising a combustion chamber, a first fuel injector for injecting fuel directly into said combustion chamber for combustion in said combustion chamber, a second fuel injector for injecting fuel to said engine at a location other than directly into said combustion chamber for combustion in said combustion chamber, a fuel tank, fuel pump means for delivering fuel from said fuel tank to each of said fuel injectors under pressure, and pressuring regulating means for supplying said second fuel injector with fuel at a pressure lower than the pressure in which fuel is supplied to said first fuel injector.

2. A fuel injection system for an internal combustion engine comprising a combustion chamber, a first fuel injector for injecting fuel to said engine at a first location for combustion in said combustion chamber, a second fuel injector for injecting fuel to said engine at a second location for combustion in said combustion chamber, a fuel tank, a fuel pump for delivering fuel from said fuel tank to each of said fuel injectors under pressure in a series flow relation, and pressuring regulating means for supplying said second fuel injector with fuel at a pressure lower than the pressure in which fuel is supplied to said first fuel injector, said pressure regulating means regulating pressure by returning excess flow of fuel to said fuel tank, and pressure regulating means comprising a first pressure regulator disposed in said series flow path between said first and second fuel injectors and adapted to regulate to a relatively high pressure and a second pressure regulator being disposed between said second fuel injector and a return to said fuel tank and being adapted to supply a lower regulated pressure.

3. A fuel injection system for an internal combustion engine as set forth in claim 1, wherein the fuel injectors are in series flow relationship with the fuel pump means and the fuel tank.

4. A fuel injection system for an internal combustion engine as set forth in claim 3, wherein the pressure regulating means regulates pressure by returning excess flow of fuel to the fuel tank.

5. A fuel injection system for an internal combustion engine as set forth in claim 4, wherein the pressure regulating means comprising a first pressure regulator disposed in the flow path between the first and second fuel injectors and adapted to regulate to a relatively high pressure and a second pressure regulator being disposed between the second fuel injector and the return to the fuel tank and being adapted to supply a lower regulated pressure.

6. A fuel injection system for an internal combustion engine as set forth in claim 1, wherein the other location comprises an induction passage for the engine and the engine operates on the two stroke crankcase compression principal.

7. A fuel injection system for an internal combustion engine as set forth in claim 6, wherein the fuel injectors are in series flow relationship with the fuel pump means and the fuel tank.

8. A fuel injection system for an internal combustion engine as set forth in claim 7, wherein the pressure regulating means regulates pressure by returning excess flow of fuel to the fuel tank.

9. A fuel injection system for an internal combustion engine as set forth in claim 8, wherein the pressure regulating means comprising a first pressure regulator disposed in the flow path between the first and second fuel injectors and adapted to regulate to a relatively high pressure and a second pressure regulator being disposed between the second fuel injector and the return to the fuel tank and being adapted to supply a lower regulated pressure.

10. A fuel injection system for an internal combustion engine as set forth in claim 1, wherein at least one of the fuel injectors also injects air under pressure.

11. A fuel injection system for an internal combustion engine as set forth in claim 10, wherein the other location comprises an induction passage for the engine and the engine operates on the two stroke crankcase compression principal.

* * * * *